(12) United States Patent
Kariya

(10) Patent No.: US 9,533,908 B2
(45) Date of Patent: *Jan. 3, 2017

(54) GLASS-SUBSTRATE MANUFACTURING METHOD

(71) Applicant: AvanStrate Inc., Yokkaichi-Shi, Mie (JP)

(72) Inventor: Hiroyuki Kariya, Yokkaichi (JP)

(73) Assignee: AvanStrate Inc., Miei (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/693,461

(22) Filed: Apr. 22, 2015

(65) Prior Publication Data

US 2015/0225276 A1    Aug. 13, 2015

Related U.S. Application Data

(63) Continuation of application No. 13/727,219, filed on Dec. 26, 2012, now Pat. No. 9,038,416, which is a
(Continued)

(30) Foreign Application Priority Data

Mar. 31, 2011 (JP) ................................. 2011-081236
Mar. 31, 2011 (JP) ................................. 2011-081237

(51) Int. Cl.
*C03B 17/06* (2006.01)
*C03B 25/12* (2006.01)
(Continued)

(52) U.S. Cl.
CPC ............ *C03B 17/067* (2013.01); *C03B 17/064* (2013.01); *C03B 25/12* (2013.01); *G02F 1/1303* (2013.01);
(Continued)

(58) Field of Classification Search
None
See application file for complete search history.

(56) References Cited

U.S. PATENT DOCUMENTS 3,682,609 A    8/1972    Dockerty
6,758,064 B1   7/2004    Kariya
(Continued)

FOREIGN PATENT DOCUMENTS

JP    05-124827 A     5/1993
JP    2001-031435 A   2/2001
(Continued)

OTHER PUBLICATIONS

English Translation of the International Preliminary Report on Patentability and Written Opinion of the International Searching Authority mailed Oct. 17, 2013 for corresponding International Application No. PCT/JP2012/058710.
(Continued)

*Primary Examiner* — Lisa Herring
(74) *Attorney, Agent, or Firm* — Sughrue Mion, PLLC

(57) ABSTRACT

A glass-substrate manufacturing method which includes a forming step and a cooling step. In the forming step, a molten glass is formed into a sheet glass by a down-draw process. In the cooling step, the sheet glass is cooled. The cooling step includes first, second and third coating steps as defined herein.

18 Claims, 7 Drawing Sheets

Related U.S. Application Data continuation of application No. PCT/JP2012/058710, filed on Mar. 30, 2012.

(51) Int. Cl.
  *G02F 1/13* (2006.01)
  *G02F 1/1333* (2006.01)

(52) U.S. Cl.
  CPC .... *G02F 2001/133302* (2013.01); *Y02P 40/57* (2015.11)

(56) References Cited

U.S. PATENT DOCUMENTS

| | | |
|---|---|---|
| 2009/0100873 A1 | 4/2009 | Allan et al. |
| 2009/0226733 A1* | 9/2009 | Kato .................... C03B 17/067 428/428 |
| 2010/0126221 A1 | 5/2010 | Danielson et al. |
| 2012/0159990 A1* | 6/2012 | Tsuda .................... C03B 17/064 65/53 |
| 2013/0017366 A1 | 1/2013 | Kawaguchi et al. |
| 2014/0013805 A1 | 1/2014 | Kariya et al. |

FOREIGN PATENT DOCUMENTS

| | | | |
|---|---|---|---|
| JP | 3335291 B2 | 10/2002 | |
| JP | 3875748 B2 | 1/2007 | |
| JP | 2008-088005 A | 4/2008 | |
| JP | 2009-502706 A | 1/2009 | |
| JP | 2009-196879 A | 9/2009 | |
| WO | WO 2011007617 A1 * | 1/2011 | .......... C03B 17/064 |
| WO | 2011-118547 A1 | 9/2011 | |

OTHER PUBLICATIONS

Machine Translation of JP050124827, performed JPO website Aug. 21, 2014.

JP05-124827 English Translation Performed by FLS, Inc. Oct. 2013.

* cited by examiner

GLASS-SUBSTRATE MANUFACTURING METHOD

CROSS REFERENCE TO RELATED APPLICATIONS

This application is a continuation application of U.S. application Ser. No. 13/727,219 filed Dec. 26, 2012, which is a continuation of International Application No. PCT/JP2012/058710 filed Mar. 30, 2012, which claims benefit to Japanese Application No. 2011-081236 filed Mar. 31, 2011 and Japanese Patent Application No. 2011-081237 filed Mar. 31, 2011, the above-noted applications incorporated herein by reference in their entirety.

TECHNICAL FIELD

The present invention relates to a glass-substrate manufacturing method.

BACKGROUND ART

Various methods for manufacturing TFT-type displays by employing down-draw processing have been conventionally proposed, as disclosed in Patent Literature 1 (Japanese Patent Application Laid-Open Publication JP-A-2009-196879). In down-draw processing, molten glass is first poured into a forming member, and then the molten glass is made to overflow from the top sections of the forming member. The molten glass that has overflowed then flows downward along the opposite side surfaces of the forming member, and the streams of molten glass merge at the lower end of the forming member, thus being made into a sheet-form glass (sheet glass). The sheet glass is then cooled while being drawn downward by drawing rollers. The cooled sheet glass is then cut into predetermined lengths and made into glass substrates.

SUMMARY OF INVENTION

Technical Problem

Incidentally, glass substrates for flat panel displays, such as liquid crystal displays, are provided with semiconductor elements such as thin film transistors (TFTs). At the time of forming the TFTs, the glass substrate is subjected to a heat treatment at high temperatures. Thus, the glass substrate undergoes structural relaxation, and its volume contracts due to thermal contraction. At this time, if the thermal contraction rate is large, the circuit pattern formed on the glass substrate may move out of place.

The method disclosed in Patent Literature 1 has been proposed as a means for solving this problem. According to this method, in the annealing step of the down-draw process, the average cooling rate from the annealing point to a temperature 50° C. below the annealing point is made lower than the average cooling rate from a temperature 100° C. above the annealing point to the annealing point. In this way, it is possible to obtain a glass having a small thermal contraction rate. As described above, Patent Literature 1 defines cooling rates in the flow direction of the sheet glass with consideration given to the thermal contraction rate. However, there still is a need to make the thermal contraction rate favorable while further improving productivity. Moreover, in Patent Literature 1, it is not possible to make the thickness of the sheet glass uniform and also reduce the warpage and strain of the sheet glass while making the thermal contraction rate favorable.

An objective of the present invention is to provide a glass-substrate manufacturing method with which it is possible to increase the production amount of glass substrates when manufacturing glass substrates by employing down-draw processing, as well as manufacture glass substrates having a favorable thermal contraction rate.

Solution to Problem

A glass-substrate manufacturing method according to an aspect of the present invention includes a forming step and a cooling step. In the forming step, a molten glass is formed into a sheet glass by a down-draw process. In the cooling step, the sheet glass is cooled. The cooling step includes a first cooling step, a second cooling step, and a third cooling step. In the first cooling step, the sheet glass is cooled at a first average cooling rate until the temperature of a central region of the sheet glass drops to the annealing point. In the second cooling step, the sheet glass is cooled at a second average cooling rate until the temperature of the central region drops from the annealing point to a temperature 50° C. below the strain point. In the third cooling step, the sheet glass is cooled at a third average cooling rate until the temperature of the central region drops from the temperature 50° C. below the strain point to a temperature 200° C. below the strain point. The first average cooling rate is 5.0° C./second or faster. The first average cooling rate is faster than the third average cooling rate. The third average cooling rate is faster than the second average cooling rate. The smaller the second average cooling rate, the smaller the thermal contraction rate of the sheet glass becomes. Thus, by making the second average cooling rate the slowest among the first to third average cooling rates, the thermal contraction rate of the sheet glass can be reduced effectively. In this way, it is possible to manufacture ideal glass substrates and also increase the production amount of glass substrates. Note here that the central region of the sheet glass is a region including sections subjected to thickness equalization, and the end sections of the sheet glass are regions including sections subjected to cutting after manufacture.

It is preferable that the first average cooling rate is within the range of 5.0° C./second to 50° C./second. If the first average cooling rate is below 5.0° C./second, then productivity becomes poor. If the first average cooling rate is above 50° C./second, then the glass may break, and the warpage value and the thickness deviation of the sheet glass become poor. It should be noted that the first average cooling rate is more preferably within the range of 5.0° C./second to 45° C./second, and even more preferably within the range of 5.0° C./second to 40° C./second.

It is preferable that the first cooling step includes: a first temperature control step in which the temperature of end sections in the width direction of the sheet glass is lower than the temperature of the central region sandwiched between the end sections, and in which the temperature of the central region is kept uniform; and a second temperature control step in which, after the first temperature control step has been performed, the temperature in the width direction of the sheet glass is decreased from a central section of the sheet glass toward the end sections thereof.

In the first temperature control step, by making the temperature of the end sections in the width direction of the sheet glass lower than the temperature of the central region, the viscosity of the end sections of the sheet glass is increased. Thus, contraction in the width direction of the sheet glass can be inhibited. If the sheet glass contracts in the width direction, the contracted sections become thick, and thickness deviation becomes poor. So, by making the temperature of the widthwise (lateral) end sections of the sheet glass lower than the temperature of the central region, the plate thickness can be made uniform. Moreover, in the first temperature control step, by keeping the temperature of the central region of the sheet glass uniform, the viscosity of the central region becomes uniform, and thus, the thickness of the sheet glass can be made uniform.

It should be noted that, in order to make the plate thickness more uniform, the first temperature control step is preferably performed immediately below the forming member, and preferably performed before the sheet glass is cooled to a temperature near the glass softening point. Herein, "near the glass softening point" preferably refers to a temperature region from 20° C. below the glass softening point to 20° C. above the glass softening point.

Moreover, it is preferable that the second cooling step includes a third temperature control step in which a temperature gradient between each end section and the central section in the width direction of the sheet glass is decreased as the temperature of the sheet glass approaches near the glass strain point.

In the second temperature control step, a temperature gradient is formed in which the temperature in the width direction of the sheet glass decreases from the central section toward the end sections. In the third temperature control step, the temperature gradient formed in the second temperature control step is reduced during the course of cooling the sheet glass toward temperatures near the glass strain point. In this way, the amount of volumetric shrinkage of the sheet glass increases from the end sections of the sheet glass toward the central section, and thus, a tensile stress acts on the widthwise central section of the sheet glass. Particularly, a tensile stress acts on the central section of the sheet glass in both the flow direction and the width direction of the sheet glass. It should be noted that, preferably, the tensile stress acting in the flow direction of the sheet glass is larger than the tensile stress acting in the width direction of the sheet glass. With this tensile stress, the sheet glass can be cooled while maintaining the flatness of the sheet glass. Thus, by controlling the widthwise temperature distributions of the sheet glass in the second temperature control step and the third temperature control step, warpage and strains in the sheet glass can be reduced.

If the sheet glass has a temperature gradient at the glass strain point, then a strain will occur when the sheet glass is cooled to room temperature. So, in the third temperature control step, the sheet glass is cooled in a manner such that the widthwise temperature gradient is reduced toward a temperature region near the glass strain point. Thus, strains after cooling can be reduced.

Moreover, it is preferable that the difference in temperature between each end section and the central section in the width direction of the sheet glass during the cooling step is made the smallest in the third temperature control step. If the sheet glass has a difference in temperature at the glass strain point, then a strain will occur after the sheet glass is cooled to room temperature. So, by minimizing the widthwise temperature difference between each widthwise (lateral) end section and the widthwise central section of the sheet glass within a temperature region near the glass strain point, strains in the sheet glass can be reduced.

It should be noted that it is more preferable that, in the second temperature control step, the widthwise temperature gradient of the sheet glass gradually decreases toward the downstream side in the flow direction of the sheet glass.

Moreover, it is more preferable that, in the second temperature control step, the widthwise temperature gradient of the sheet glass is formed in a manner such that the temperature in the width direction of the sheet glass gradually decreases from the central section toward the end sections.

Furthermore, it is more preferable that, in the second temperature control step, the temperature in the width direction of the sheet glass gradually decreases from the central section toward the end sections, and that this widthwise temperature gradient of the sheet glass gradually decreases toward the downstream side in the flow direction of the sheet glass.

Moreover, it is more preferable that, in the second temperature control step, the temperature in the width direction of the sheet glass gradually decreases according to a convex profile from the central section toward the end sections.

Furthermore, it is more preferable that, in the second temperature control step, the temperature in the width direction of the sheet glass gradually decreases according to a convex profile from the central section toward the end sections, and that this widthwise temperature gradient of the sheet glass gradually decreases toward the downstream side in the flow direction of the sheet glass.

Moreover, it is preferable that the second cooling step includes a third temperature control step in which a temperature gradient between each end section and the center section in the width direction of the sheet glass is decreased as the temperature of the sheet glass approaches near the glass strain point.

Moreover, it is preferable that the third cooling step includes a fourth temperature control step in which the temperature in the width direction of the sheet glass is decreased from the end sections toward the central section in the width direction of the sheet glass.

In this way, the cooling amount of the sheet glass increases from the end sections toward the central section of the sheet glass. Accordingly, a tensile stress is applied to the central section of the sheet glass in the flow direction and the width direction of the sheet glass, as described above. Thus, the sheet glass can be cooled while maintaining the flatness of the sheet glass, and thus warpage of the sheet glass can be reduced.

Moreover, it is more preferable that, in the fourth temperature control step, a temperature gradient is formed in a manner such that the temperature of the sheet glass gradually decreases according to a convex profile from the widthwise (lateral) end sections toward the central section.

Furthermore, it is preferable that the second average cooling rate is from 0.5° C./second to 5.5° C./second, and the third average cooling rate is from 1.5° C./second to 7.0° C./second.

If the second average cooling rate is below 0.5° C./second, then productivity will deteriorate. If the second average cooling rate exceeds 5.5° C./second, then the thermal contraction rate of the sheet glass will increase, and warpage and strains in the sheet glass will become poor.

If the third average cooling rate is below 1.5° C./second, then productivity will deteriorate. If the third average cooling rate exceeds 7.0° C./second, the sheet glass may break, and warpage of the sheet glass will become poor.

It should be noted that, preferably, the second average cooling rate is within the range of 1.0° C./second to 3.0° C./second, and the third average cooling rate is preferably within the range of 2.0° C./second to 5.5° C./second.

Moreover, it is preferable that the sheet glass cooled by the cooling step has a thermal contraction rate of 100 ppm or less.

It should be noted that, more preferably, the sheet glass cooled by the cooling step has a thermal contraction rate within the range of 20 to 100 ppm, and even more preferably within the range of 20 to 95 ppm, and particularly preferably within the range of 20 to 90 ppm.

Moreover, it is preferable that the cooling step further includes a temperature gradient control step of controlling the widthwise temperature gradient of the sheet glass along the flow direction of the sheet glass.

By controlling the cooling rates along the flow direction of the sheet glass so that they assume the aforementioned first average cooling rate, the second average cooling rate, and the third average cooling rate during the temperature gradient control step, the thermal contraction rate of the sheet glass can be made favorable. Moreover, by controlling the widthwise temperature gradient of the sheet glass, it is possible to manufacture glass substrates having uniform thickness and reduced in warpage and strain. The glass substrate production amount can also be increased.

It is also preferable that the sheet glass cooled by the cooling step has a strain value of 1.0 nm or less.

It should be noted that, more preferably, the sheet glass cooled by the cooling step has a strain value within the range of 0 to 0.95 nm, and even more preferably within the range of 0 to 0.90 nm.

It is also preferable that the sheet glass cooled by the cooling step has a warpage value of 0.15 mm or less.

It should be noted that, more preferably, the sheet glass cooled by the cooling step has a warpage value within the range of 0 to 0.10 mm, and even more preferably within the range of 0 to 0.05 mm.

It is also preferable that the sheet glass cooled by the cooling step has a thickness deviation of 15 μm or less.

It should be noted that, more preferably, the sheet glass cooled by the cooling step has a thickness deviation within the range of 0 to 14 μm, and even more preferably within the range of 0 to 13 μm.

Advantageous Effects of Invention

With the glass-substrate manufacturing method according to the present invention, it is possible to increase the production amount of glass substrates as well as manufacture ideal glass substrates.

DESCRIPTION OF EMBODIMENTS

In the glass-substrate manufacturing method according to the present embodiment, a glass substrate for a TFT display having a predetermined thermal contraction rate is manufactured. This predetermined thermal contraction rate is 100 ppm or less. The glass substrate is manufactured by employing a down-draw process. The glass-substrate manufacturing method according to the present embodiment will be described below with reference to the drawings.

(1) Overview of Glass-Substrate Manufacturing Method

Figure 1:
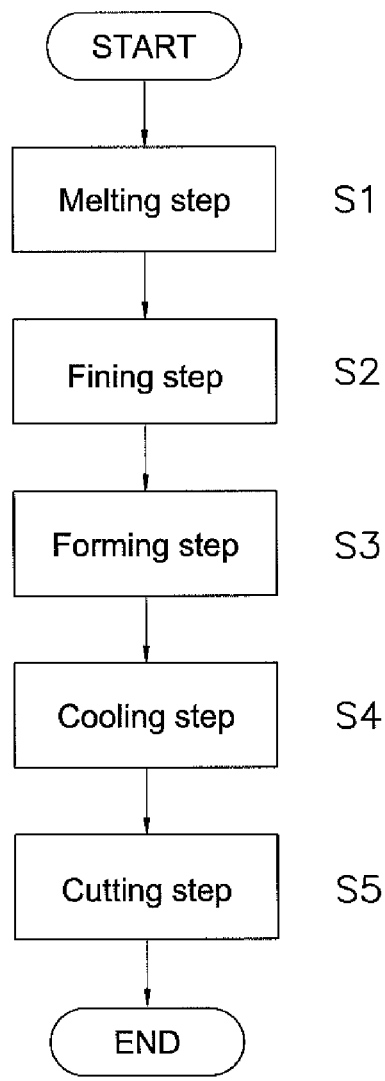
FIG. 1 is a flowchart illustrating a glass-substrate manufacturing method according to an embodiment.
Figure 2:
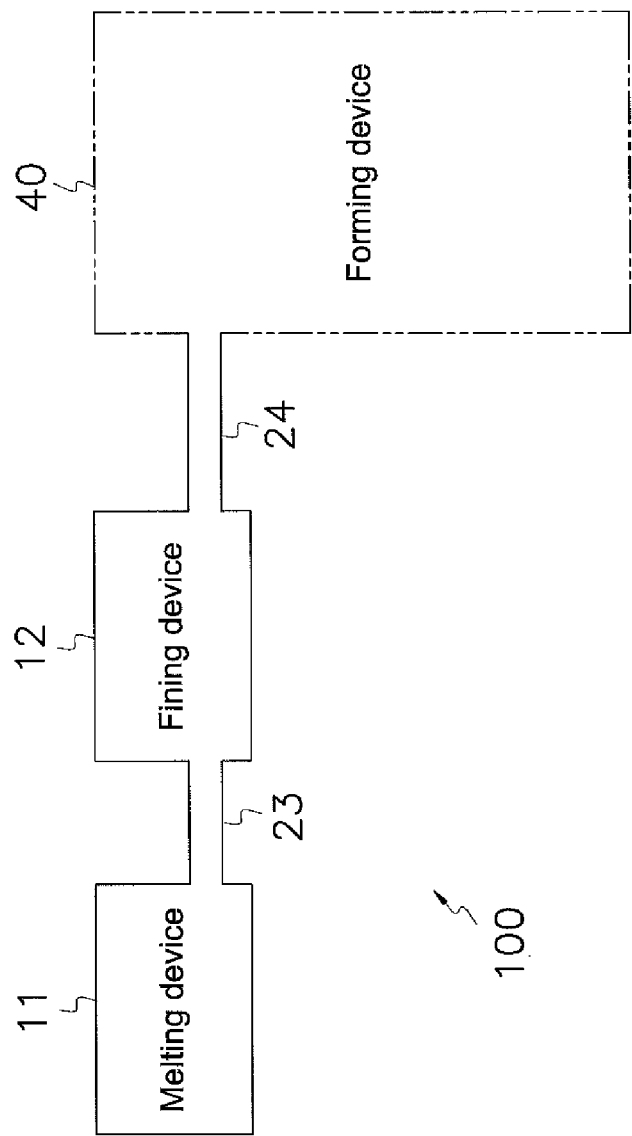
FIG. 2 is a schematic diagram illustrating a glass-substrate manufacturing device used in the glass-substrate manufacturing method.

First, the plurality of steps involved in the glass-substrate manufacturing method and a glass-substrate manufacturing device 100 used for those steps will be described with reference to FIGS. 1 and 2. As illustrated in FIG. 1, the glass-substrate manufacturing method mainly involves a melting step S1, a fining step S2, a forming step S3, a cooling step S4, and a cutting step S5.

The melting step S1 is a step where a glass raw material is melted. The glass raw material is first blended and prepared so that it has a desired composition, and then, as illustrated in FIG. 2, the glass raw material is introduced into a melting device 11 which is disposed in an upstream position. The glass raw material has a composition including, for example, $SiO_2$, $Al_2O_3$, $B_2O_3$, CaO, SrO, and BaO. More specifically, a glass raw material having a strain point higher than or equal to 660° C. is used. The glass raw material is melted in the melting device 11 and made into a molten glass FG. The melting temperature is adjusted depending on the type of glass. In the present embodiment, the glass raw material is melted at temperatures between 1500° C. and 1650° C. The molten glass FG is sent to a fining device 12 through an upstream pipe 23.

The fining step S2 is a step where bubbles in the molten glass FG are removed. After the bubbles are removed in the fining device 12, the molten glass FG is then sent to a forming device 40 through a downstream pipe 24.

The forming step S3 is a step in which the molten glass FG is formed into a piece of sheet-form glass (sheet glass) SG. Specifically, the molten glass FG is continuously supplied into a forming member 41 included in the forming device 40, and is then made to overflow from the forming member 41. The molten glass FG that has overflowed then flows downward along the surfaces of the forming member 41. The streams of the molten glass FG then merge at the lower end of the forming member 41, and the molten glass is formed into a sheet glass SG.

The cooling step S4 is a step in which the sheet glass SG is cooled (annealed). Through this cooling step S4, the glass sheet is cooled to a temperature close to room temperature. It should be noted that the thickness (plate thickness) of the glass substrate, the amount of warpage of the glass substrate, and the amount of strain of the glass substrate are determined depending on the cooling state in this cooling step S4.

The cutting step S5 is a step in which the sheet glass SG, which has reached a temperature close to room temperature, is cut into predetermined sizes.

It should be noted that the pieces of sheet glass SG (glass plates PG) that have been cut into predetermined sizes then undergo such steps as end-surface processing and are made into glass substrates.

The configuration of the forming device 40 included in the glass-substrate manufacturing device 100 will be described below with reference to FIGS. 3 to 5. It should be noted that, in the present embodiment, the width direction of the sheet glass SG refers to a direction intersecting with the direction in which the sheet glass SG flows downward (i.e., the flow direction)—i.e., the width direction refers to the horizontal direction.

(2) Configuration of Forming Device

Figure 3:
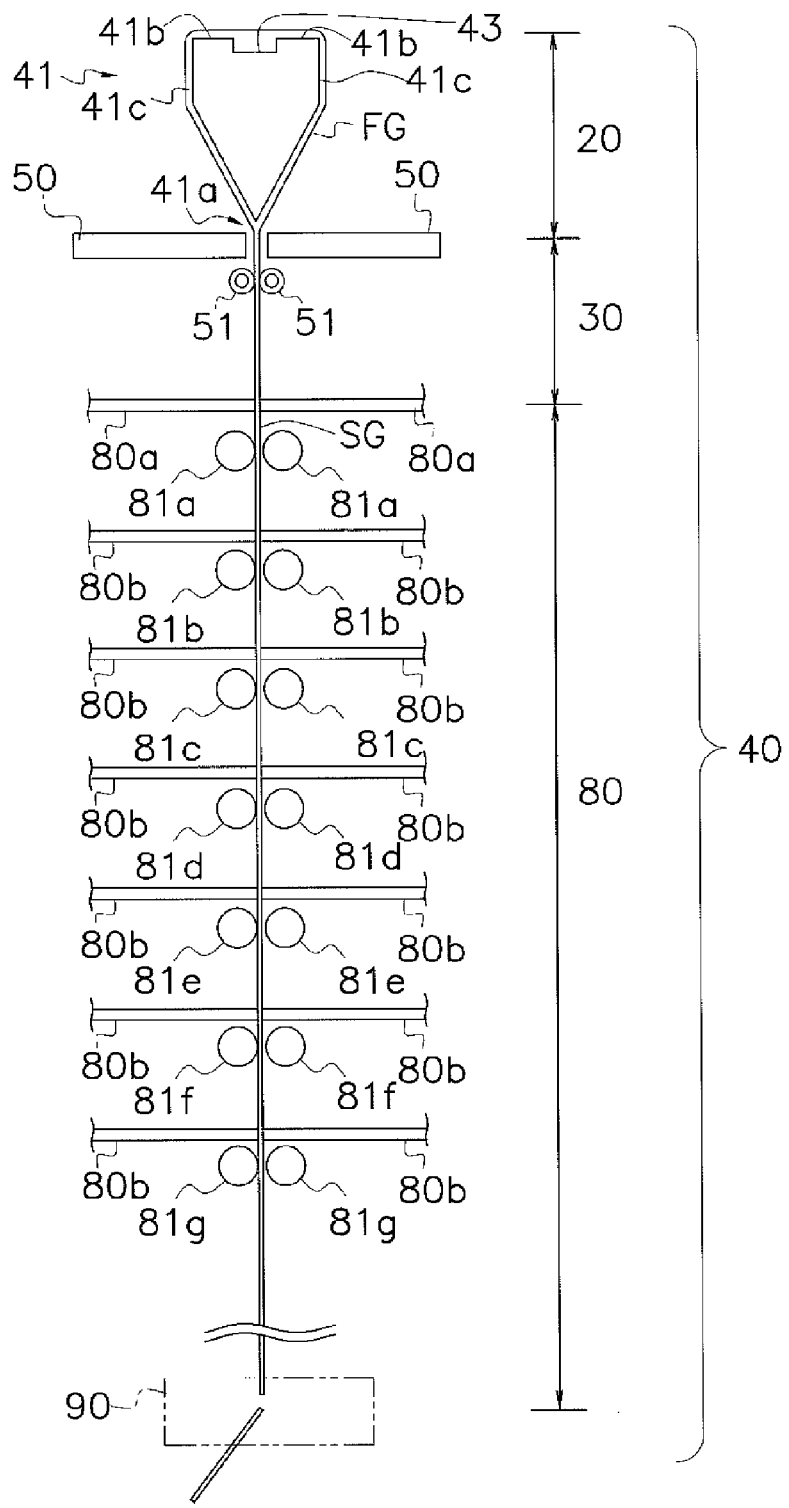
FIG. 3 is a schematic diagram (cross-sectional view) of a forming device.
Figure 4:
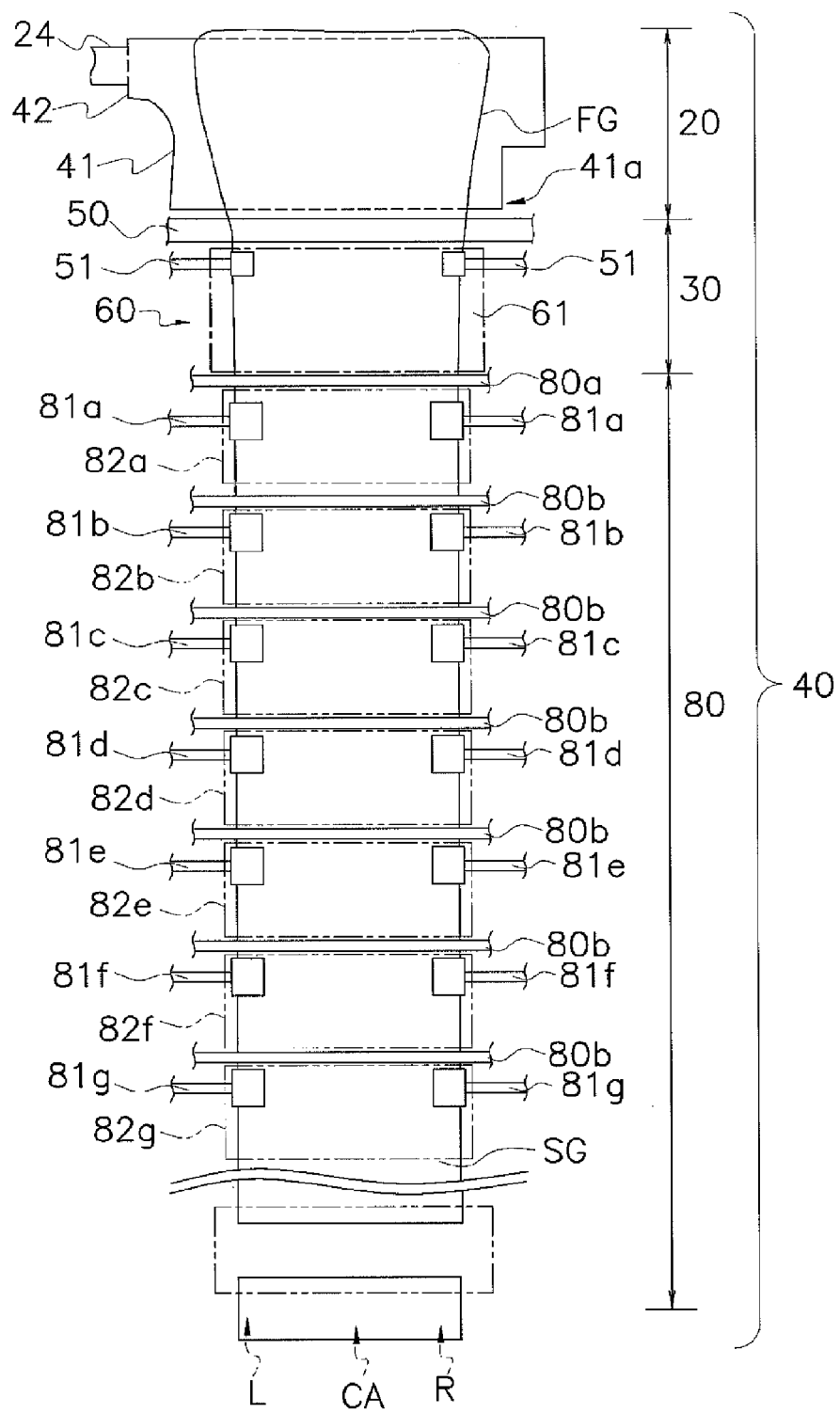
FIG. 4 is a schematic diagram (side view) of the forming device.

First, FIGS. 3 and 4 illustrate a schematic configuration of the forming device 40. FIG. 3 is a cross-sectional view of the forming device 40. FIG. 4 is a side view of the forming device 40.

The forming device 40 includes a passage through which the sheet glass SG passes, and a space surrounding the passage. The space surrounding the passage is made up of a forming member chamber 20, a first cooling chamber 30, and a second cooling chamber 80.

The forming member chamber 20 is a space where the molten glass FG sent from the fining device 12 is formed into a sheet glass SG.

The first cooling chamber 30 is a space located below the forming member chamber 20 and in which the thickness and the amount of warpage of the sheet glass SG are adjusted. In the first cooling chamber 30, a portion of the first cooling step S41 (described further below) is executed. Specifically, in the first cooling chamber 30, the upstream region of the sheet glass SG is cooled (upstream-region cooling step). The "upstream region of the sheet glass SG" is a region of the sheet glass SG in which the temperature of the center section C of the sheet glass SG is above the annealing point. Here, the center section C of the sheet glass SG refers to the center in the width direction of the sheet glass SG. Specifically, the upstream region includes a first temperature region and a second temperature region. The first temperature region is a region of the sheet glass SG up to where the temperature of the center section C of the sheet glass SG comes near the softening point. The second temperature region is a temperature region in which the temperature of the center section C of the sheet glass SG ranges from a temperature near the softening point to a temperature near the annealing point. After passing the first cooling chamber 30, the sheet glass SG passes through the second cooling chamber 80 described below.

The second cooling chamber 80 is a space located below the first cooling chamber 30 and in which the warpage and the amount of strain of the sheet glass SG are adjusted. In the second cooling chamber 80, a portion of the first cooling step S41 (described further below), the second cooling step S42, and the third cooling step S43 are executed. Specifically, in the second cooling chamber 80, the sheet glass SG which has passed through the first cooling chamber 30 is cooled to a temperature near room temperature after passing the annealing point and the strain point (downstream-region cooling step). It should be noted that the interior of the second cooling chamber 80 is partitioned into a plurality of spaces by heat-insulating members 80b.

Moreover, the forming device 40 is mainly made up of: a forming member 41; partitioning components 50; cooling rollers 51; a temperature adjustment unit 60; down-draw rollers 81a-81g; heaters 82a-82g; and a cutting device 90. The forming device 40 also includes a control device 91 (see FIG. 5). The control device 91 controls the respective drive sections of the components included in the forming device 40.

The various components included in the forming device 40 will be described in detail below.

(2-1) Forming Member

The forming member 41 is provided in the forming member chamber 20. The forming member 41 shapes the molten glass FG into a sheet-form glass (sheet glass SG) by making the molten glass FG overflow therefrom.

As illustrated in FIG. 3, the forming member 41 has a substantially pentagonal cross-sectional shape (a shape like a wedge). The tip end of the substantially pentagonal shape corresponds to the lower end 41a of the forming member 41.

The forming member 41 also has an inlet 42 in the first end thereof (see FIG. 4). The inlet 42 is connected to the aforementioned downstream pipe 24, and the molten glass FG that has flowed out from the fining device 12 is introduced into the forming member 41 through this inlet 42. The forming member 41 has a groove 43 formed therein. The groove 43 extends in the length direction of the forming member 41. Specifically, the groove 43 extends from the first end to a second end which is the end on the opposite side from the first end. More specifically, the groove 43 extends in the left-to-right direction in FIG. 4. The groove 43 is deepest near the inlet 42, and is formed such that it becomes gradually shallower as it approaches the second end. The molten glass FG introduced into the forming member 41 overflows from a pair of top sections 41b, 41b of the forming member 41, and flows downward along a pair of side surfaces (surfaces) 41c, 41c of the forming member 41. The streams of molten glass FG then merge at the lower end 41a of the forming member 41, and the molten glass is made into a sheet glass SG.

At this time, the liquid-phase temperature of the sheet glass SG is 1100° C. or higher, and the liquid-phase viscosity is $2.5 \times 10^5$ poise or higher.

(2-2) Partitioning Components

The partitioning components 50 are components for blocking the movement of heat from the forming member chamber 20 to the first cooling chamber 30. The partitioning components 50 are disposed near the merging point of the molten glass FG. As illustrated in FIG. 3, the partitioning components 50 are disposed on opposite sides in the thickness direction of the molten glass FG (sheet glass SG) that has merged at the merging point. The partitioning components 50 are made of a heat insulator. The partitioning components 50 partition the upper atmosphere and the lower atmosphere with respect to the merging point of the molten glass FG, and thereby block the movement of heat from above to below the partitioning components 50.

(2-3) Cooling Rollers

The cooling rollers 51 are provided in the first cooling chamber 30. More specifically, the cooling rollers 51 are disposed immediately below the partitioning components 50. Also, the cooling rollers 51 are disposed on opposite sides in the thickness direction of the sheet glass SG and on opposite sides in the width direction of the sheet glass SG. The cooling rollers 51 disposed on opposite sides in the thickness direction of the sheet glass SG operate in pairs. That is, there are two pairs of cooling rollers 51, 51, and so on, each pair sandwiching one of the opposite side sections (opposite widthwise (lateral) end sections) of the sheet glass SG.

Each cooling roller 51 is cooled by air with an air-cooling pipe passed through the interior thereof. The cooling rollers 51 contact the side sections (edges) R, L of the sheet glass SG and rapidly cool the side sections (edges) R, L of the sheet glass SG through heat conduction (rapid-cooling step). The viscosity of the side sections R, L of the sheet glass SG that have contacted the cooling rollers 51 is higher than or equal to a predetermined value (specifically, $10^{9.0}$ poise).

Figure 5:
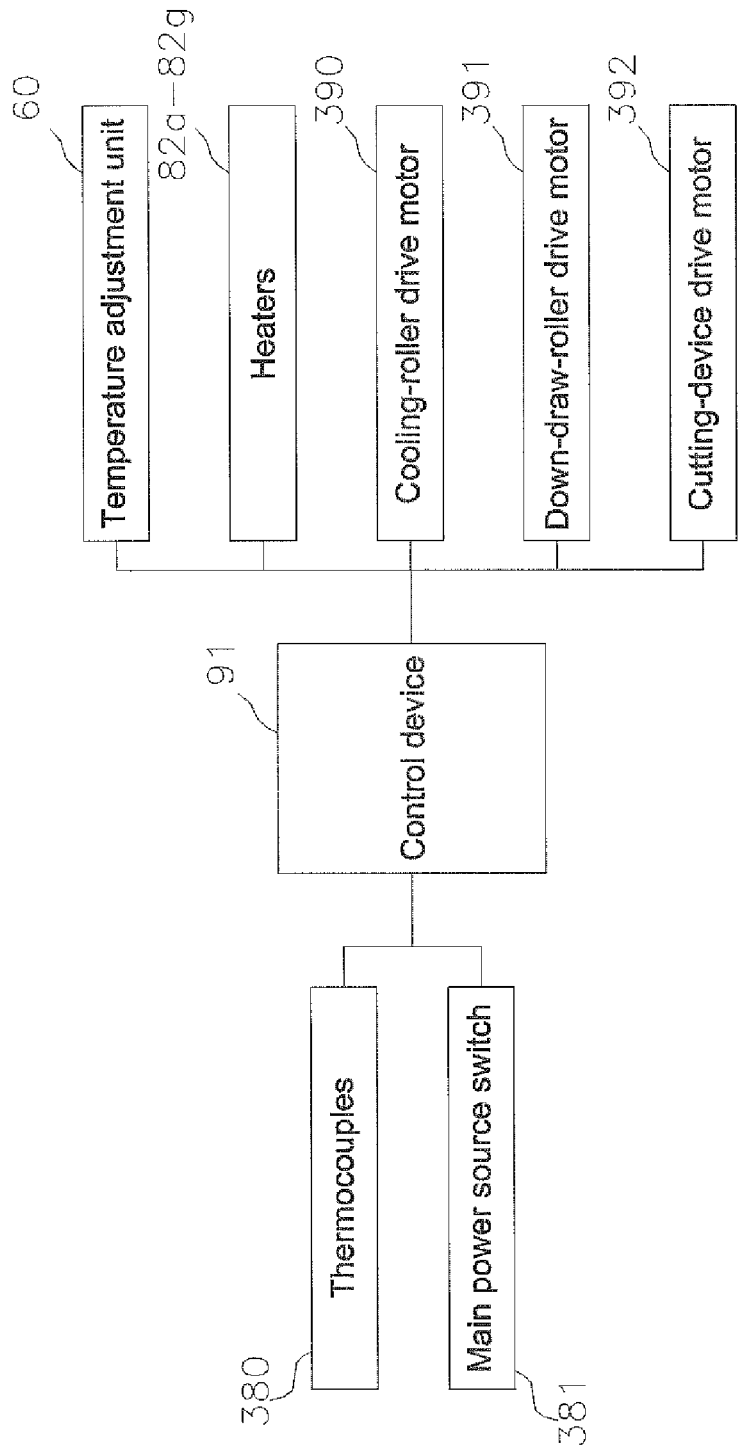
FIG. 5 is a control block diagram of a control device.

The cooling rollers 51 are rotated and driven by a cooling-roller drive motor 390 (see FIG. 5). The cooling rollers 51 not only cool the side sections R, L of the sheet glass SG, but also function to draw the sheet glass SG downward.

It should be noted that the cooling of the side sections R, L of the sheet glass SG by the cooling rollers 51 has an effect on the width W of the sheet glass SG and the equalization of the thickness of the sheet glass SG.

(2-4) Temperature Adjustment Unit

The temperature adjustment unit 60 is a unit provided in the first cooling chamber 30 and in which the sheet glass SG is cooled to a temperature near the annealing point. The temperature adjustment unit 60 is disposed below the partitioning components 50 and on the top plate 80*a* of the second cooling chamber 80.

The temperature adjustment unit 60 cools the upstream region of the sheet glass SG (upstream-region cooling step). Specifically, the temperature adjustment unit 60 cools the sheet glass SG in a manner such that the temperature of the center section C of the sheet glass SG nears the annealing point. The center section C of the sheet glass SG is then cooled in the later-mentioned second cooling chamber 80 to a temperature near room temperature after passing the annealing point and the strain point (downstream-region cooling step).

The temperature adjustment unit 60 includes cooling units 61. A plurality of cooling units 61 (three in this embodiment) are arranged in the width direction of the sheet glass SG, and a plurality thereof are arranged in the flow direction. Specifically, each of two cooling units 61 is disposed so as to oppose the surface of each edge R, L of the sheet glass SG, and one cooling unit 61 is disposed so as to oppose the surface of the later-mentioned central region CA (see FIGS. 4 and 7). Herein, the central region CA of the sheet glass SG refers to a central portion of the sheet glass SG in the width direction thereof, and is a region that includes the valid width of the sheet glass SG and the vicinity thereof. Stated differently, the central region CA of the sheet glass SG is the portion sandwiched by both the side sections (edges) of the sheet glass SG. It should be noted that the central region CA of the sheet glass SG is a region including sections subjected to thickness equalization, and the edges R, L of the sheet glass SG are regions including sections subjected to cutting after manufacture.

(2-5) Down-Draw Rollers

The down-draw rollers 81*a*-81*g* are provided in the second cooling chamber 80, and draw downward the sheet glass SG, which has passed through the first cooling chamber 30, in the flow direction of the sheet glass SG. The down-draw rollers 81*a*-81*g* are arranged at predetermined intervals along the flow direction inside the second cooling chamber 80. A plurality of down-draw rollers 81*a*-81*g* are disposed on opposite sides in the thickness direction of the sheet glass SG (see FIG. 3) and on opposite sides in the width direction of the sheet glass SG (see FIG. 4). That is, the down-draw rollers 81*a*-81*g* draw the sheet glass SG downward while contacting both the side sections (edges) R, L in the width direction of the sheet glass SG and both surfaces of the sheet glass SG in the thickness direction thereof.

The down-draw rollers 81*a*-81*g* are driven by a down-draw-roller drive motor 391 (see FIG. 5), and the down-draw rollers 81*a*-81*g* rotate inward with respect to the sheet glass SG. The peripheral speed of the down-draw rollers 81*a*-81*g* becomes faster the more downstream the down-draw rollers are located. That is, among the down-draw rollers 81*a*-81*g*, the peripheral speed of the down-draw rollers 81*a* is the slowest, and the peripheral speed of the down-draw rollers 81*g* is the fastest. The down-draw rollers 81*a*-81*g* disposed on both sides in the thickness direction of the sheet glass SG operate in pairs, and the pairs of down-draw rollers 81*a*, 81*a*, and so on, draw the sheet glass SG downward.

(2-6) Heaters

The heaters 82*a*-82*g* are provided inside the second cooling chamber 80 and adjust the temperature of the interior space of the second cooling chamber 80. Specifically, a plurality of heaters 82*a*-82*g* are arranged in the flow direction of the sheet glass SG and in the width direction of the sheet glass SG. More specifically, seven heaters are arranged in the flow direction of the sheet glass SG, and three heaters are arranged in the width direction of the sheet glass. The three heaters arranged in the width direction each perform heat treatment on the central region CA of the sheet glass SG and the respective edges R, L of the sheet glass SG. The output of each heater 82*a*-82*g* is controlled by a control device 91 (described further below). Thus, the ambient temperatures in the vicinity of the sheet glass SG passing inside the second cooling chamber 80 are controlled. By controlling the ambient temperatures inside the second cooling chamber 80 with the heaters 82*a*-82*g*, the temperature of the sheet glass SG is controlled. Further, by performing this temperature control, the sheet glass SG transitions from the viscous range to the elastic range through the viscoelastic range. By controlling the heaters 82*a*-82*g* in this way, the temperature of the sheet glass SG is cooled in the second cooling chamber 80 from a temperature near the annealing point to a temperature near room temperature (downstream-region cooling step).

It should be noted that ambient temperature detection means (in this embodiment, thermocouples) 380 for detecting the ambient temperatures are provided near the respective heaters 82*a*-82*g*. Specifically, a plurality of thermocouples 380 are arranged in the flow direction of the sheet glass SG and the width direction of the sheet glass SG. The thermocouples 380 each detect the temperature of the center section C of the sheet glass SG and the temperatures of the edges R, L of the sheet glass SG. The output of each heater 82*a*-82*g* is controlled on the basis of the ambient temperatures detected by the thermocouples 380.

(2-7) Cutting Device

The cutting device 90 cuts the sheet glass SG, which has been cooled to a temperature near room temperature inside the second cooling chamber 80, into predetermined sizes. The cutting device 90 cuts the sheet glass SG at predetermined time intervals. Thus, the sheet glass SG is cut into a plurality of glass plates PG. The cutting device 90 is driven by a cutting-device drive motor 392 (see FIG. 5).

(2-8) Control Device

The control device 91 is made up of a CPU, a RAM, a ROM, a hard disk, and the like, and controls the various components included in the glass-plate manufacturing device 100.

More specifically, as illustrated in FIG. 5, the control device 91 controls the temperature adjustment unit 60, the heaters 82*a*-82*g*, the cooling-roller drive motor 390, the down-draw-roller drive motor 391, the cutting-device drive motor 392, and the like in response to signals from various sensors (e.g., the thermocouples 380) and switches (e.g., a main power source switch 381) included in the glass-substrate manufacturing device 100.

(3) Temperature Management

In the glass-substrate manufacturing method of the present embodiment, the cooling step S4 involves a plurality of cooling steps S41, S42, and S43. Specifically, a first cooling step S41, a second cooling step S42, and a third cooling step S43 are executed in order along the flow direction of the sheet glass SG.

Moreover, in the cooling step S4, temperature management is performed in the flow direction and the width direction of the sheet glass SG. The temperature management is performed according to a plurality of temperature profiles TP1-TP10. Each temperature profile TP1-TP10 is a temperature distribution of ambient temperatures in the vicinity of the sheet glass SG along the width direction of the sheet glass SG. Stated differently, the temperature profiles TP1-TP10 are target temperature distributions. That is, the temperature management is performed so as to achieve these temperature profiles TP1-TP10. The temperature management is performed by using the aforementioned cooling rollers 51, the temperature adjustment unit 60, and the heaters 82a-82g.

The temperature of the sheet glass SG is managed by controlling the ambient temperatures of the sheet glass SG. It should be noted that the temperature of the sheet glass SG employed herein may be an actually measured value of the temperature of the sheet glass SG, or a value calculated through simulation on the basis of the ambient temperatures of the sheet glass SG controlled by the heaters 82a-82g.

In the cooling steps S41-S43, the temperature management in the flow direction of the sheet glass SG is performed by cooling the sheet glass SG at predetermined cooling rates. Herein, "predetermined cooling rates" are cooling rates corresponding to the respective cooling steps S41-S43. Specifically, among the cooling rates of the cooling steps S41-S43, the cooling rate of the first cooling step (first cooling rate) is the fastest. On the other hand, among the cooling rates of the cooling steps S41-S43, the cooling rate of the second cooling step (second cooling rate) is the slowest. So, the cooling rate of the third cooling step (third cooling rate) is slower than the first cooling rate and faster than the second cooling rate (i.e., first cooling rate>third cooling rate>second cooling rate).

Further, in the cooling step S4 according to the present embodiment, the cooling rate of the center section C of the sheet glass SG (center-section cooling rate) and the cooling rate of the edges R, L of the sheet glass SG (edge cooling rate) are set to different rates. The center-section cooling rate is calculated on the basis of the amount of temperature change in the center section C of the sheet glass SG and the time required for the temperature change. The edge cooling rate is calculated on the basis of the amount of temperature change in each edge R, L of the sheet glass SG and the time required for the temperature change.

Figure 6:
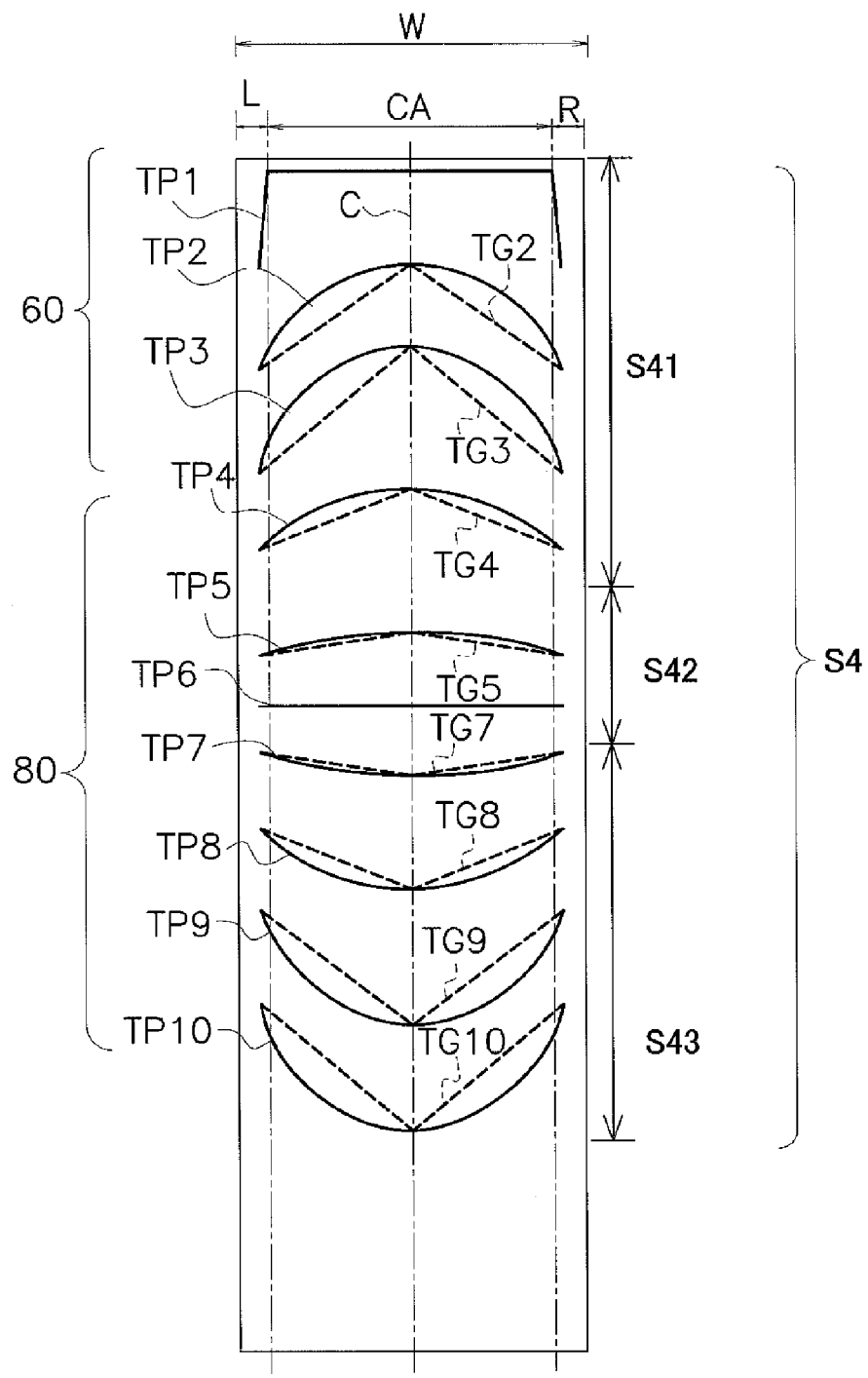
FIG. 6 is a diagram illustrating temperature profiles at predetermined height positions of a sheet glass.
Figure 7:
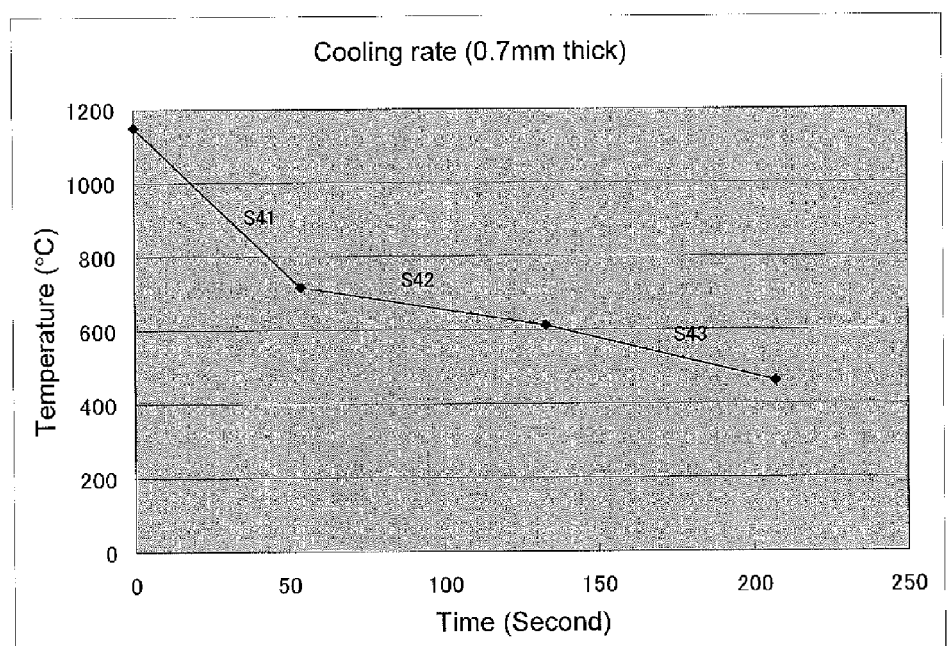
FIG. 7 is a diagram illustrating an example of a sheet glass cooling rate.

The temperature management of the sheet glass SG in the cooling steps S41-S43 will be described in detail below with reference to FIGS. 6 and 7. FIG. 6 illustrates temperature profiles at predetermined height positions of the sheet glass SG. FIG. 7 illustrates a cooling rate of a sheet glass SG (0.7 mm thick).

(3-1) First Cooling Step

The first cooling step S41 is a step of cooling the molten glass that has merged immediately below the forming member 41 to a temperature near the annealing point. Specifically, in the first cooling step, the sheet glass SG having a temperature ranging from about 1,100° C. to 1,200° C. is cooled to a temperature near the annealing point (see FIG. 7). Herein, the "annealing point" refers to a temperature at which the viscosity becomes $10^{13}$ poise, and is 715.0° C. herein.

In the first cooling step S41, the temperature management of the sheet glass SG is performed on the basis of first to fourth temperature profiles TP1-TP4. The temperature profiles TP1-TP4 executed in the first cooling step S41 and the cooling rate of the first cooling step (first cooling rate) will be described in detail below.

(3-1-1) First Temperature Profile

The first temperature profile TP1 is the temperature distribution achieved on the most upstream side of the sheet glass SG (see FIG. 6). In the first temperature profile TP1, the temperature of the central region CA of the sheet glass SG is uniform, and the temperatures of the edges R, L of the sheet glass SG are lower than the temperature of the central region CA of the sheet glass SG. Herein, the expression "the temperature of the central region CA is uniform" means that the temperature of the central region CA falls within a predetermined temperature range. This predetermined temperature range is within ±20° C. of a reference temperature. The reference temperature is the average temperature in the width direction of the central region CA.

The first temperature profile TP1 is achieved by controlling the cooling rollers 51 and the temperature adjustment unit 60 in the first cooling chamber 30. Specifically, the edges R, L of the sheet glass SG are cooled by the cooling roller 51, and the temperatures of the edges R, L of the sheet glass SG are cooled to temperatures lower by a predetermined temperature (for example, 200° C. to 250° C. lower) than the temperature of the central region CA. This first temperature profile TP1 makes the thickness of the sheet glass SG uniform.

It should be noted that, preferably, the temperature management according to the first temperature profile TP1 is performed immediately below the forming member to make the thickness of the sheet glass SG more uniform, and preferably performed before the sheet glass SG is cooled to a temperature near the glass softening point. Herein, "near the glass softening point" preferably refers to a temperature region from 20° C. below the glass softening point to 20° C. above the glass softening point.

(3-1-2) Second and Third Temperature Profiles

The second and third temperature profiles TP2, TP3 are temperature distributions achieved after the first temperature profile TP1 (see FIG. 6). Specifically, the second temperature profile TP2 is located on the upstream side, and the third temperature profile TP3 is located on the downstream side with respect to the flow direction of the sheet glass SG.

In the second and third temperature profiles TP2, TP3, the temperature of the center section C of the central region CA is the highest, and the temperatures of the edges R, L are the lowest. Further, in the second and third temperature profiles TP2, TP3, the temperature gradually decreases from the center section C toward the edges R, L. That is, a gradient (temperature gradient) is formed between the temperature of the center section C and the temperature of each edge R, L. Stated differently, the second and third temperature profiles TP2, TP3 each form a gentle, upward-convex parabola. It should be noted here that the "temperature gradient" refers to a quotient found by dividing, by half the width W (for example, 1650 mm; see FIG. 6) of the sheet glass SG, a value found by subtracting the ambient temperature of the edge R, L from the ambient temperature of the center section C (i.e., ("ambient temperature of center section C"−"ambient temperature of edge R, L")/("width W of sheet glass"/2)).

Further, the temperature gradient TG3 in the third temperature profile TP3 is larger than the temperature gradient TG2 in the second temperature profile TP2. Stated differently, the difference between the ambient temperature of the edge R, L of the sheet glass SG and the ambient temperature of the center section C (i.e., the widthwise temperature difference) in the third temperature profile TP3 is larger than the widthwise temperature difference in the second temperature profile TP2. That is, the third temperature profile TP3 forms a larger parabola than the second temperature profile TP2. In the second and third temperature profiles TP2, TP3, large parabolic profiles are achieved in order to cool the edges R, L faster than the center section C.

It should be noted that the second and third temperature profiles TP2, TP3 are achieved by controlling the temperature adjustment unit 60 in the first cooling chamber 30.

(3-1-3) Fourth Temperature Profile

The fourth temperature profile TP4 is a temperature distribution achieved after the third temperature profile TP3 (see FIG. 6). Also in the fourth temperature profile TP4, the temperature of the center section C of the central region CA is the highest, and the temperatures of the edges R, L are the lowest. Further, also in the fourth temperature profile TP4, the temperature gradually decreases from the center section C toward the edges R, L, and the fourth temperature profile TP4 forms a gentle, upward-convex parabola.

It should be noted that the temperature gradient TG4 in the fourth temperature profile TP4 is smaller than the temperature gradient TG3 in the upstream third temperature profile TP3. That is, the fourth temperature profile TP4 forms a smaller parabola than the third temperature profile TP3.

It should be noted that the fourth temperature profile TP4 is achieved by controlling the heaters 82a in the second cooling chamber 80.

(3-1-4) First Cooling Rate

In the first cooling step S41, the ambient temperatures of the edges R, L are cooled at a faster average cooling rate than the ambient temperature of the center section C. That is, the average cooling rate of the edges R, L (first edge cooling rate) is faster than the average cooling rate of the center section C (first center-section cooling rate).

The first center-section cooling rate in the first cooling step S41 is from 5.0° C./second to 50.0° C./second. If the cooling rate is below 5.0° C./second, then productivity becomes poor. If the cooling rate is above 50° C./second, then the sheet glass SG may break, and the warpage value and the thickness deviation of the sheet glass SG become poor. Preferably, the first center-section cooling rate is from 8.0° C./second to 16.5° C./second. Further, the first edge cooling rate in the first cooling step S41 is from 5.5° C./second to 52.0° C./second. Preferably, the first edge cooling rate is from 8.3° C./second to 17.5° C./second.

(3-2) Second Cooling Step

The second cooling step S42 is a step in which the sheet glass SG, which has reached a temperature near the annealing point, is cooled to a temperature near 50° C. below the strain point (see FIG. 7). Herein, the "strain point" refers to a temperature at which the viscosity becomes $10^{14.5}$ poise, and is 661.0° C. herein. Further, "50° C. below the strain point" is 611.0° C. Specifically, in the second cooling step, the sheet glass SG, which is within the temperature range of 700° C. to 730° C., is cooled to a range of 596° C. to 626° C.

In the second cooling step S42, the temperature management of the sheet glass SG is performed on the basis of fifth and sixth temperature profiles TP5, TP6. The fifth and sixth temperature profiles TP5, TP6 executed in the second cooling step S42 and the cooling rate of the second cooling step (second cooling rate) will be described in detail below.

(3-2-1) Fifth Temperature Profile

The fifth temperature profile TP5 is a temperature distribution achieved after the fourth temperature profile TP4 (see FIG. 6). Also in the fifth temperature profile TP5, the temperature of the center section C is the highest, and the temperatures of the edges R, L are the lowest. Further, also in the fifth temperature profile TP5, the temperature gradually decreases from the center section C toward the edges R, L, and the fifth temperature profile TP5 forms a gentle, upward-convex parabola.

The temperature gradient TG5 in the fifth temperature profile TP5 is smaller than the temperature gradient TG4 in the fourth temperature profile TP4. That is, the fifth temperature profile TP5 forms a smaller parabola than the fourth temperature profile TP4.

It should be noted that the fifth temperature profile TP5 is achieved by controlling the heaters 82b in the second cooling chamber 80.

(3-2-2) Sixth Temperature Profile

In the sixth temperature profile TP6, the ambient temperature in the width direction of the sheet glass SG (the ambient temperature from the widthwise (lateral) edges R, L to the center section C) is uniform. Stated differently, the sixth temperature profile TP6 is a temperature profile in which the temperature gradient in the width direction of the sheet glass SG between the ambient temperatures around the edges R, L and the ambient temperature around the center section C is the smallest, and the ambient temperatures around the edges R, L and the ambient temperature around the center section C are almost the same.

Herein, "uniform" means that the ambient temperatures around the edges R, L and the ambient temperature around the center section C are included within a predetermined temperature range. The "predetermined temperature range" is a range within ±5° C. of a reference temperature. The "reference temperature" is the average temperature in the width direction of the sheet glass SG.

It should be noted that the sixth temperature profile TP6 is achieved by controlling the heaters 82c in the second cooling chamber 80. Further, the sixth temperature profile TP6 is achieved near the strain point. Herein, "near the strain point" refers to a predetermined temperature region including the strain point (660° C.). The "predetermined temperature region" refers to a region from half the sum of the annealing point and the strain point (("annealing point"+"strain point")/2) to 50° C. below the strain point ("strain point"−50° C.). The sixth temperature profile TP6 is achieved at least at one point near the strain point (at one location in the flow direction).

(3-2-3) Second Cooling Rate

In the second cooling step S42, the ambient temperature of the center section C of the sheet glass SG and the ambient temperatures of the edges R, L are controlled in a manner such that the ambient temperature in the width direction of the sheet glass SG become substantially constant. That is, the average cooling rate of the center section C (second center-section cooling rate) is slightly faster than the average cooling rate of the edges R, L (second edge cooling rate).

The second center-section cooling rate in the second cooling step S42 is from 0.5° C./second to 5.5° C./second. If the second center-section cooling rate is below 0.5° C./second, then productivity becomes poor. If the second center-section cooling rate is above 5.5° C./second, then the thermal contraction rate of the sheet glass SG will increase, and warpage and strains in the sheet glass SG will become poor. Preferably, the second center-section cooling rate is from 1.0° C./second to 3.0° C./second. Further, the second edge cooling rate in the second cooling step S42 is from 0.3°

C./second to 5.3° C./second. Preferably, the second edge cooling rate is from 0.8° C./second to 2.8° C./second.

(3-3) Third Cooling Step

The third cooling step S43 is a step in which the sheet glass SG, which has reached a temperature near 50° C. below the strain point, is cooled to a temperature near 200° C. below the strain point (see FIG. 7). Specifically, in the third cooling step, the sheet glass SG, which is within the temperature range of 596° C. to 626° C., is cooled to a range of 446° C. to 476° C.

In the third cooling step S43, the temperature management of the sheet glass SG is performed on the basis of seventh to tenth temperature profiles TP7-TP10. The temperature profiles TP7-TP10 executed in the third cooling step S43 and the cooling rate of the third cooling step (third cooling rate) will be described in detail below.

(3-3-1) Seventh to Tenth Temperature Profiles

The seventh to tenth temperature profiles TP7-TP10 are temperature distributions achieved after the sixth temperature profile TP6 (see FIG. 6). Specifically, the seventh to tenth temperature profiles TP7-TP10 are achieved along the flow direction of the sheet glass SG. More specifically, the seventh temperature profile TP7 is achieved on the upstream side, and then the eighth temperature profile TP8 is achieved. After the eighth temperature profile TP8, the ninth temperature profile TP9 is achieved, and then the tenth temperature profile TP10 is achieved on the downstream side.

In the seventh to tenth temperature profiles TP7-TP10, the temperature of the center section C of the central region CA is the lowest, and the temperatures of the edges R, L are the highest. Further, in the seventh to tenth temperature profiles TP7-TP10, the temperature gradually increases from the center section C toward the edges R, L. That is, a gradient (temperature gradient) is formed between the temperature of the center section C and the temperature of each edge R, L. Stated differently, the seventh to tenth temperature profiles TP7-TP10 each form a gentle, downward-convex parabola.

Further, the temperature gradients TG7-TG10 in the seventh to tenth temperature profiles TP7-TP10 gradually increase along the flow direction of the sheet glass SG. Stated differently, the difference between the ambient temperature of the edge R, L of the sheet glass SG and the ambient temperature of the center section C (i.e., the widthwise temperature difference) in the tenth temperature profile TP10 is larger than the widthwise temperature difference in the seventh temperature profile TP7. That is, the tenth temperature profile TP10 forms a larger parabola than the seventh temperature profile TP7. In the seventh to tenth temperature profiles TP7-TP10, the center section C is cooled faster than the edges R, L.

It should be noted that the seventh to tenth temperature profiles TP7-TP10 are achieved by controlling the heaters 82d-82g in the second cooling chamber 80, respectively. Specifically, the seventh temperature profile TP7 is achieved by the heaters 82d, the eighth temperature profile TP8 is achieved by the heaters 82e, the ninth temperature profile TP9 is achieved by the heaters 82f, and the tenth temperature profile TP10 is achieved by the heaters 82g.

(3-3-2) Third Cooling Rate

In the third cooling step S43, the ambient temperature of the center section C is cooled at a faster rate than the ambient temperatures of the edges R, L. That is, the average cooling rate of the center section C (third center-section cooling rate) is faster than the average cooling rate of the edges R, L (third edge cooling rate).

Further, in the third cooling step S43, the difference between the cooling rate of the ambient temperatures of the edges R, L of the sheet glass SG and the cooling rate of the ambient temperature of the center section C is increased toward the downstream side in the flow direction of the sheet glass SG.

The third center-section cooling rate in the third cooling step S43 is from 1.5° C./second to 7.0° C./second. If the third center-section cooling rate is below 1.5° C./second, then productivity becomes poor. If the third center-section cooling rate is above 7.0° C./second, then the sheet glass SG may break, and warpage of the sheet glass SG becomes poor. Preferably, the third center-section cooling rate is from 2.0° C./second to 5.5° C./second. Further, the third edge cooling rate in the third cooling step S43 is from 1.3° C./second to 6.8° C./second. Preferably, the third edge cooling rate is from 1.5° C./second to 5.0° C./second.

Examples

Glass substrates were manufactured according to the following conditions by using the aforementioned glass-substrate manufacturing device 100 and the glass-substrate manufacturing method.

The glass composition (mass %) is: 60% $SiO_2$; 17% $Al_2O_3$; 10% $B_2O_3$; 3% CaO; 3% SrO; and 1% BaO. The liquid-phase temperature of the glass is 1,100° C., and the liquid-phase viscosity is $2.5 \times 10^5$ poise. The glass annealing point is 715.0° C., and the strain point is 661° C. The width of the sheet glass SG is 1600 mm. Pieces of sheet glasses SG with different thicknesses (0.3 mm, 0.35 mm, 0.5 mm, and 0.7 mm) were manufactured.

Tables 1 to 4 each show actually measured values regarding the change in temperature of each sheet glass SG (° C.) and the time required for the temperature change (seconds), values (interpolated values) regarding the time required to reach the annealing point (715° C.), 50° C. below the strain point (611° C.), and 200° C. below the strain point (461° C.) found by performing interpolation based on the actually measured values, and cooling rates in the center section C (° C./second) in the cooling step S4. Tables 1 to 4 respectively show values regarding sheet glasses SG with thicknesses of 0.7 mm, 0.5 mm, 0.35 mm, and 0.3 mm.

In the cooling step S4, the respective cooling steps are performed in a manner such that the cooling rate in the first cooling step S41 has the largest value, the cooling rate in the third cooling step S43 has the second largest value, and the cooling rate in the second cooling step S42 has the smallest value.

TABLE 1

| Cooling step | Change in temperature of sheet glass (° C.) and time required (seconds) (0.7 mm) | | | | Average cooling rate in center section | Average cooling rate in end sections |
|---|---|---|---|---|---|---|
| | Time | L | C | R | | |
| S41 | 0 | 1150 | 1150 | 1150 | 8.06 | 8.44 |
| | 46 | 710.3 | 729.5 | 713.3 | | |
| | 54 | 694.94 | 715 (Annealing point) | 699.19 | | |
| S42 | 60 | 682 | 703.8 | 687.3 | 1.32 | 1.05 |
| | 119 | 622.2 | 621.4 | 629.9 | | |
| | 133 | 612.51 | 611 (Strain point-50) | — | | |

TABLE 1-continued

| Cooling step | Change in temperature of sheet glass (° C.) and time required (seconds) (0.7 mm) | | | Average cooling rate in center section | Average cooling rate in end sections |
|---|---|---|---|---|---|
| | Time | L | C | R | | |
| S43 | 147 | 602.7 | 600.2 | — | 2.03 | 1.71 |
| | 193 | 547.2 | 524.5 | 553.9 | | |
| | 207 | 484.66 | 461 (Strain point-200) | 503.22 | | |
| — | 208 | 481.8 | 458.3 | 500.9 | — | — |

TABLE 2

| Cooling step | Change in temperature of sheet glass (° C.) and time required (seconds) (0.5 mm) | | | Average cooling rate in center section | Average cooling rate in end sections |
|---|---|---|---|---|---|
| | Time | L | C | R | | |
| S41 | 0 | 1150 | 1150 | 1150 | 11.76 | 12.36 |
| | 33 | 706.8 | 723.5 | 713.2 | | |
| | 37 | 695.88 | 715 (Annealing point) | 703.49 | | |
| S42 | 43 | 679.7 | 700.9 | 689.1 | 2.08 | 1.72 |
| | 84 | 612.2 | 613.5 | 629.7 | | |
| | 87 | 609.32 | 611 (Strain point-50) | — | | |
| S43 | 104 | 592.8 | 596.5 | — | 2.11 | 2.09 |
| | 158 | 462.2 | 463.2 | 478 | | |
| | 158 | 460.76 | 461 (Strain point-200) | 476.4 | | |
| — | 169 | 336.7 | 315.3 | 338.3 | — | — |

TABLE 3

| Cooling step | Change in temperature of sheet glass (° C.) and time required (seconds) (0.35 mm) | | | Average cooling rate in center section | Average cooling rate in end sections |
|---|---|---|---|---|---|
| | Time | L | C | R | | |
| S41 | 0 | 1150 | 1150 | 1150 | 15.00 | 16.01 |
| | 23 | 700.4 | 736.4 | 714.8 | | |
| | 29 | 684.32 | 715 (Annealing point) | 696.98 | | |
| S42 | 30 | 681.9 | 711.8 | 694.3 | 2.60 | 1.86 |
| | 59 | 627.9 | 629.9 | 638.5 | | |
| | 69 | 611.04 | 611 (Strain point-50) | — | | |
| S43 | 73 | 603 | 602.2 | — | 4.69 | 3.67 |
| | 96 | 543.5 | 524.4 | 555.5 | | |
| | 101 | 491.35 | 461 (Strain point-200) | 516.74 | | |
| — | 103 | 469.1 | 439 | 500.2 | — | — |

TABLE 4

| Cooling step | Change in temperature of sheet glass (° C.) and time required (seconds) (0.3 mm) | | | Average cooling rate in center section | Average cooling rate in end sections |
|---|---|---|---|---|---|
| | Time | L | C | R | | |
| S41 | 0 | 1150 | 1150 | 1150 | 16.11 | 17.28 |
| | 27 | 681.9 | 715.6 | 692 | | |
| | 27 | 681.46 | 715 (Annealing point) | 691.46 | | |
| S42 | 33 | 665.4 | 684.5 | 671.8 | 2.81 | 1.79 |
| | 53 | 627.1 | 634 | 627.9 | | |
| | 64 | 615.97 | 611 (Strain point-50) | — | | |
| S43 | 66 | 614 | 606.2 | — | 5.17 | 4.22 |
| | 86 | 566.9 | 539.2 | 568.8 | | |
| | 93 | 493.5 | 461 (Strain point-200) | 513.67 | | |
| — | 93 | 492.2 | 458.7 | 512.7 | — | — |

Table 5 shows the actually measured values of the thermal contraction rate, the strain value, and the warpage value of the glass substrates when the sheet glasses SG are cooled at the cooling rates (° C./second) shown in Tables 1 to 4. As shown in Table 5, the thermal contraction rate is 100 ppm or less, the strain value is 1.0 nm or less, the warpage value is 0.15 mm or less, and the thickness deviation is 15 μm or less.

TABLE 5

| | Average cooling rate | | | |
|---|---|---|---|---|
| | 0.7 mm | 0.5 mm | 0.35 mm | 0.3 mm |
| First cooling step: From cell tip to annealing point (1,150° C. to 715° C.) | 8.06 | 11.76 | 15.00 | 16.11 |
| Second cooling step: From annealing point to 50° C. below strain point (715° C. to 611° C.) | 1.32 | 2.08 | 2.60 | 2.81 |
| Third cooling step: From 50° C. below strain point to 200° C. below strain point (611° C. to 461° C.) | 2.03 | 2.11 | 4.69 | 5.17 |
| Thermal contraction rate (ppm) | 85.76 | 90.47 | 94.26 | 95.35 |
| Strain value | 1.0 nm | 0.7 nm | 0.48 nm | 0.41 nm |
| Warpage value | 0.15 mm or less | | | |
| Thickness deviation | 10.8 μm | 10.4 μm | 8.6 μm | 7.9 μm |

It should be noted that, in the aforementioned examples, the thermal contraction rate of each glass substrate is found according to the scribe-line method. Specifically, scribe lines are formed as reference lines on opposite ends of a sample glass substrate, and then the sample is cut in half. Then, one of the two pieces of the sample, which has been cut in half, is subjected to a heat treatment. Thereafter, the heat-treated sample piece is placed against the other non-treated sample piece, and the misalignment between the scribe lines is measured. The heat treatment is performed at 550° C. for 60 minutes, and this cycle is performed twice. More specifically, the temperature of the sample is raised from room temperature at 10° C./minute, is kept at 550° C. for 60 minutes, is then lowered to room temperature at 10° C./minute, is again raised at 10° C./minute, is kept at 550° C. for 60 minutes, and is then lowered to room temperature at 10° C./minute. The amount of thermal contraction of the glass substrate (the thermal contraction rate) is found on the basis of the measurement value of the misalignment between the scribe lines.

The strain value of the glass substrate is a value regarding plane strain. The strain value is determined on the basis of the magnitude of the birefringence rate. The birefringence rate is measured by using a birefringence measurement device ABR-10A (product of Uniopt Corporation, Ltd.), and the maximum value is adopted as the strain value.

The warpage value of the glass substrate is measured as follows. First, a plurality of glass pieces are cut out from a glass plate PG having a predetermined valid width and cut out from a sheet glass (mother glass). Next, each glass piece is placed on a glass surface plate. Then, the gap between the glass piece and the glass surface plate is measured (in the present embodiment, at the four corners of the glass piece, at two points in the central section along the long side, and at two points in the central section along the short side) with a feeler gauge.

The thickness deviation was measured at intervals of 5 mm along the width direction in the valid region of the glass plate by using a displacement gauge (product of Keyence Corporation).

(4) Characteristic Features (4-1)

In the foregoing embodiment, the sheet glass SG is cooled at different cooling rates in the three cooling steps S41-S43 included in the cooling step S4 for cooling the sheet glass SG. Specifically, among the three cooling steps S41-S43, the cooling rate of the first cooling step S41 is the fastest, and the cooling rate of the third cooling step S43 is the second fastest, next to the cooling rate of the first cooling step S41. Further, the cooling rate of the second cooling step S42 is the slowest of the cooling steps S41-S43. Moreover, the average cooling rate of the first cooling step S41 is 5.0° C./second or faster.

The cooling rates in the flow direction of the sheet glass SG have an effect on the thermal contraction rate of the glass substrate. Particularly, the cooling rate of the second cooling step S42 has a significant effect on the thermal contraction rate of the sheet glass SG. So, by making the cooling rate of the second cooling step S42 the slowest among the three cooling steps S41-S43, the thermal contraction rate of the sheet glass SG can be reduced effectively. Thus, it is possible to increase the production amount of glass substrates and also produce glass substrates having an ideal thermal contraction rate.

Furthermore, according to the glass-substrate manufacturing method of the present embodiment, the thickness deviation, the amount of warpage, and the amount of plane strain can be reduced within a given range, as illustrated in Table 5.

(4-2)

In the foregoing embodiment, the cooling temperatures of the edges R, L of the sheet glass SG are set to lower temperatures than the cooling temperature of the center section C of the sheet glass and a temperature gradient is formed in the width direction of the sheet glass SG, in accordance with the temperature profiles TP1-TP5 on the upstream side of the sheet glass SG. In this way, in the foregoing embodiment, the average cooling rate of the edges R, L (the first edge cooling rate) is made faster than the average cooling rate of the center section C (the first center-section cooling rate). In the second cooling step S42, the average cooling rate of the center section C (the second center-section cooling rate) is made faster than the average cooling rate of the edges R, L (the second edge cooling rate), and the temperature gradient is made smaller than the slope of the upstream-side temperature gradients. Further, also in the third cooling step S43, the average cooling rate of the center section C (the third center-section cooling rate) is made even more faster than the average cooling rate of the edges R, L (the third edge cooling rate), and the slope of the temperature gradient is increased.

In the first cooling step S41, by making the temperature of the edges R, L of the sheet glass SG lower than the temperature of the center section C, the viscosity of the edges R, L of the sheet glass SG is increased. Thus, contraction in the width direction of the sheet glass SG is inhibited. If the sheet glass SG contracts in the width direction, the contracted sections become thick, and thickness deviation becomes poor. So, by making the temperature of the edges R, L of the sheet glass SG lower than the temperature of the center section C, the plate thickness can be made uniform. Moreover, by keeping the temperature of the center section C of the sheet glass SG uniform, the viscosity of the center section C becomes uniform, and thus, the plate thickness can be made uniform.

In order to reduce the amount of warpage of the glass substrate, it is preferable to cool the sheet glass in a manner such that a tensile stress is always applied to the center section C in both the width direction and the flow direction of the sheet glass SG. If a compressive stress is applied to the widthwise center section C of the sheet glass SG, both warpage along the width direction of the sheet glass SG and warpage along the flow direction of the sheet glass SG will occur.

In the second cooling step S42, a temperature gradient is formed in which the temperature in the width direction of the sheet glass SG decreases from the center section C toward the edges R, L. The temperature gradient formed in the second cooling step S42 is reduced during the course of cooling the sheet glass SG toward temperatures near the glass strain point. That is, in the second cooling step S42, the average cooling rate of the center section C of the sheet glass SG is faster than the average cooling rate of the edges R, L of the sheet glass SG. In this way, the amount of volumetric shrinkage of the sheet glass SG is increased from the edges R, L of the sheet glass SG toward the center section C in the second cooling step S42 which is likely to affect the amount of warpage and the amount of strain, and thus, a tensile stress acts on the center section C of the sheet glass SG. Particularly, a tensile stress acts on the center section C of the sheet glass SG in both the flow direction and the width direction of the sheet glass SG. It should be noted that, preferably, the tensile stress acting in the flow direction of the sheet glass SG is larger than the tensile stress acting in the width direction of the sheet glass SG. With this tensile stress, the sheet glass SG can be cooled while maintaining the flatness of the sheet glass SG, and thus, the amount of warpage of the glass substrate can be controlled.

Further, if the sheet glass SG has a temperature gradient at the glass strain point, then a strain will occur when the sheet glass SG is cooled to room temperature. So, in the second cooling step S42, the sheet glass SG is cooled in a manner such that the widthwise temperature gradient is reduced. Thus, strains after cooling can be reduced.

Furthermore, if the sheet glass SG has a temperature difference at the glass strain point, then a strain will occur after the sheet glass SG is cooled to room temperature. So, in a temperature region near the glass strain point, the widthwise temperature difference between the edges R, L and the center section C of the sheet glass SG is reduced. Thus, strains in the sheet glass SG can be reduced.

In the third cooling step S43, the temperature in the width direction of the sheet glass SG is decreased from the edges R, L toward the center section C of the sheet glass SG. In this way, the cooling amount of the sheet glass SG increases from the edges R, L toward the center section C of the sheet glass SG. Accordingly, a tensile stress is applied to the center section C of the sheet glass SG in the flow direction and the width direction of the sheet glass SG, as described above. Thus, the sheet glass SG can be cooled while maintaining the flatness of the sheet glass SG, and thus warpage of the sheet glass SG can be reduced.

(4-3)

Moreover, in the glass-substrate manufacturing method according to the foregoing embodiment, the temperature in the width direction of the sheet glass SG is controlled so as to be uniform near the strain point. Thus, the amount of plane strain (residual stress) can be reduced.

(4-4)

In the temperature control of the sheet glass SG, the temperature control within the range from the annealing point to the strain point affects the amount of warpage and the amount of strain most significantly. In the foregoing embodiment, among the three cooling steps S41-S43, the cooling rate is made the slowest in the second cooling step S42 in which the sheet glass SG is cooled from the annealing point to a temperature 50° C. below the strain point. Thus, the accuracy of controlling the temperature of the sheet glass SG can be improved.

Further, because the sheet glass SG is in the shape of a ribbon that is continuous in the vertical direction, temperature control performed at temperatures lower than or equal to 50° C. below the strain point also tends to affect the amount of warpage and the amount of strain of the sheet glass SG. In the foregoing embodiment, the cooling rate within the range of 50° C. below the strain point to 200° C. below the strain point is made the second slowest, next to the cooling rate in the second cooling step. That is, the cooling rate in the third cooling step is made the second slowest of the three cooling steps S41-S43. Thus, the accuracy of controlling the temperature in the width direction of the sheet glass SG can be further improved.

(4-5)

In the foregoing embodiment, the temperature management of the sheet glass SG is performed according to a plurality of different temperature profiles TP1-TP4 in the first cooling step S41. By employing a plurality of different temperature profiles TP1-TP4 in the first cooling step S41, the thickness of the sheet glass SG can be made uniform, and the amount of warpage can be reduced.

(4-6)

In the foregoing embodiment, the widthwise temperature gradients of the sheet glass SG are controlled along the flow direction of the sheet glass SG in the cooling steps S41-S43. Further, the cooling rates in the flow direction of the sheet glass SG are controlled so as to achieve the aforementioned average cooling rates. In this way, the thermal contraction rate of the sheet glass SG can be made favorable. Furthermore, by controlling the widthwise temperature gradients of the sheet glass SG, it is possible to manufacture glass substrates reduced in warpage and strain and having a uniform thickness. Also, the production amount of glass substrates can be increased.

(5) Modified Examples (5-1)

The cooling rollers 51 and the temperature adjustment unit 60 employed in the foregoing embodiment may be of the air-cooled type or the water-cooled type, or a combination of both.

(5-2)

In the foregoing embodiment, seven heaters were arranged in the flow direction of the sheet glass SG and three heaters were arranged in the width direction of the sheet glass SG in the second cooling chamber 80. However, a larger number of heaters may be arranged in the flow direction and the width direction of the sheet glass SG than the number of heaters used in the foregoing embodiment.

In that way, the temperatures of the sheet glass SG can be brought closer to the temperature profiles TP1-TP10, and the accuracy of temperature management can be further improved.

(5-3)

In the foregoing embodiment, the temperature management of the sheet glass SG was performed according to ten temperature profiles TP1-TP10. However, the temperature management of the sheet glass SG may be performed by using more than ten temperature profiles. Even in cases of using more than ten temperature profiles, temperature profiles interpolated between the temperature profiles that maintain the cooling rates described in the foregoing embodiment shall be used.

(5-4)

The forming device 40 may include a plurality of heat-insulating members in the second cooling chamber 80. The heat-insulating members are to be arranged between the plurality of down-draw rollers 81a-81g and on both sides in the thickness direction of the sheet glass SG. In this way, the temperature management of the sheet glass SG can be performed with even higher accuracy.

(5-5)

In the aforementioned examples, glass substrates having a composition in which the liquid-phase temperature is 1,100° C., the liquid-phase viscosity is $2.5 \times 10^5$ poise, and the strain point is 661° C. were manufactured, but the glass-substrate manufacturing method according to the foregoing embodiment can be used as a method for manufacturing glass substrates having other compositions.

For example, it is possible to manufacture glass substrates (low-temperature p-Si glass substrates) having a composition in which the liquid-phase temperature is 1,200° C. or lower, the liquid-phase viscosity is $10^5$ poise or greater, and the strain point is 680° C. or higher. A predetermined thermal contraction rate can be obtained even in cases of manufacturing glass substrates with such a composition. Specifically, it is possible to manufacture glass substrates having a thermal contraction rate of 40 ppm or less.

It should be noted that, in this case, it is preferable to maintain the order of speed of the average cooling rates of the cooling steps S41-S43 (i.e., first cooling step>third cooling step>second cooling step), and appropriately adjust the average cooling rate for each cooling step S41-S43.

(5-6)

The present embodiment was described above with reference to the drawings, but the specific configurations are not limited to the foregoing embodiment, and various modifications can be made without departing from the gist of the invention.

(5-7)

According to the foregoing embodiment, in the second cooling step S42, the temperature in the width direction of the sheet glass SG gradually decreased from the center section C toward the edges R, L, and the widthwise temperature gradient of the sheet glass SG gradually decreased toward the downstream side in the flow direction of the sheet glass SG.

In the second cooling step S42, however, it is more preferable that the temperature in the width direction of the sheet glass SG gradually decreases according to a convex profile from the center section C toward the edges R, L.

Further, in the second cooling step S42, it is more preferable that the temperature in the width direction of the sheet glass SG gradually decreases according to a convex profile from the center section C toward the edges R, L, and the widthwise temperature gradient of the sheet glass SG gradually decreases toward the downstream side in the flow direction of the sheet glass SG.

(5-8)

According to the foregoing embodiment, in the third cooling step S43, temperature gradients were formed in a manner such that the temperature in the width direction of the sheet glass SG decreased from the edges R, L toward the center section C. In the third cooling step S43, however, it is more preferable that the temperature gradients are formed in a manner such that the temperature in the width direction of the sheet glass SG gradually decreases according to a convex profile from the edges R, L toward the center section C.

(5-9)

In the foregoing examples, the sheet glass SG cooled by the cooling step S4 exhibited a thermal contraction rate of 100 ppm or less. More preferably, however, the sheet glass SG cooled by the cooling step S4 exhibits a thermal contraction rate within the range of 20 to 100 ppm, even more preferably within the range of 20 to 95 ppm, and particularly preferably within the range of 20 to 90 ppm.

(5-10)

In the foregoing examples, the sheet glass SG cooled by the cooling step S4 exhibited a strain value of 1.0 nm or less. More preferably, however, the sheet glass SG cooled by the cooling step S4 exhibits a strain value within the range of 0 to 0.95 nm, and even more preferably within the range of 0 to 0.90 nm.

(5-11)

In the foregoing examples, the sheet glass SG cooled by the cooling step S4 exhibited a warpage value of 0.15 mm or less. More preferably, however, the sheet glass SG cooled by the cooling step S4 exhibits a warpage value within the range of 0 to 0.10 mm, and even more preferably within the range of 0 to 0.05 mm.

(5-12)

In the foregoing examples, the sheet glass SG cooled by the cooling step S4 exhibited a thickness deviation of 15 μm or less. More preferably, however, the sheet glass SG cooled by the cooling step S4 exhibits a thickness deviation within the range of 0 to 14 μm, and even more preferably within the range of 0 to 13 μm.

INDUSTRIAL APPLICABILITY

The present invention is applicable to glass-substrate manufacturing methods employing down-draw processing.

REFERENCE SIGNS LIST

11: Melting device
12: Fining device
40: Forming device
41: Forming member
51: Cooling rollers
60: Temperature adjustment unit
81a-81g: Down-draw rollers
82a-82g: Heaters
90: Cutting device
91: Control device
100: Glass-substrate manufacturing device
C: Center section of sheet glass
R, L: Edges (widthwise (lateral) end sections) of sheet glass
SG: Sheet glass
S3: Forming step
S4: Cooling step
S41: First cooling step
S42: Second cooling step
S43: Third cooling step

CITATION LIST

Patent Literature

Patent Literature 1: Japanese Patent Application Laid-Open Publication JP-A-2009-196879

The invention claimed is:

1. A glass-substrate manufacturing method comprising a forming step of forming a molten glass into a sheet glass by a down-draw process, and a cooling step of cooling the sheet glass, wherein:
the cooling step includes
a first cooling step of cooling the sheet glass at a first average cooling rate until the temperature of a central region of the sheet glass drops to the annealing point,
a second cooling step of cooling the sheet glass at a second average cooling rate until the temperature of the central region drops from said annealing point to a temperature 50° C. below the strain point, and
a third cooling step of cooling the sheet glass at a third average cooling rate until the temperature of the central region drops from said temperature 50° C. below the strain point to a temperature 200° C. below the strain point;
the first average cooling rate is 5.0° C./second or faster and 50.0° C./second or slower;
the first average cooling rate is faster than the third average cooling rate;
the third average cooling rate is faster than the second average cooling rate; and
the sheet glass cooled by said cooling step has a thermal contraction rate of 100 ppm or less and a strain value of 1.0 nm or less.

2. The glass-substrate manufacturing method according to claim 1, wherein the first cooling step includes:
a first temperature control step in which the temperature of end sections in the width direction of the sheet glass is lower than the temperature of the central region sandwiched between the end sections, and in which the temperature of the central region is kept uniform; and
a second temperature control step in which, after the first temperature control step has been performed, the temperature in the width direction of the sheet glass is decreased from a central section of the sheet glass toward the end sections thereof.

3. The glass-substrate manufacturing method according to claim 2, wherein the second cooling step includes
a third temperature control step in which a temperature gradient between each said end section and said central section in the width direction of the sheet glass is decreased as the temperature of the sheet glass approaches near the glass strain point.

4. The glass-substrate manufacturing method according to claim 3, wherein the third cooling step includes
a fourth temperature control step in which the temperature in the width direction of the sheet glass is decreased from the end sections toward the central section in the width direction of the sheet glass.

5. The glass-substrate manufacturing method according to claim 3, wherein:
the second average cooling rate is from 0.5° C./second to 5.5° C./second; and
the third average cooling rate is from 1.5° C./second to 7.0° C./second.

6. The glass-substrate manufacturing method according to claim 2, wherein the third cooling step includes
a fourth temperature control step in which the temperature in the width direction of the sheet glass is decreased from the end sections toward the central section in the width direction of the sheet glass.

7. The glass-substrate manufacturing method according to claim 6, wherein:
the second average cooling rate is from 0.5° C./second to 5.5° C./second; and
the third average cooling rate is from 1.5° C./second to 7.0° C./second.

8. The glass-substrate manufacturing method according to claim 2, wherein:
the second average cooling rate is from 0.5° C./second to 5.5° C./second; and
the third average cooling rate is from 1.5° C./second to 7.0° C./second.

9. The glass-substrate manufacturing method according to claim 1, wherein the second cooling step includes
a third temperature control step in which a temperature gradient between each said end section and said central section in the width direction of the sheet glass is decreased as the temperature of the sheet glass approaches near the glass strain point.

10. The glass-substrate manufacturing method according to claim 9, wherein the third cooling step includes
a fourth temperature control step in which the temperature in the width direction of the sheet glass is decreased from the end sections toward the central section in the width direction of the sheet glass.

11. The glass-substrate manufacturing method according to claim 10, wherein:
the second average cooling rate is from 0.5° C./second to 5.5° C./second; and
the third average cooling rate is from 1.5° C./second to 7.0° C./second.

12. The glass-substrate manufacturing method according to claim 9, wherein:
the second average cooling rate is from 0.5° C./second to 5.5° C./second; and
the third average cooling rate is from 1.5° C./second to 7.0° C./second.

13. The glass-substrate manufacturing method according to claim 1, wherein the third cooling step includes
a fourth temperature control step in which the temperature in the width direction of the sheet glass is decreased from the end sections toward the central section in the width direction of the sheet glass.

14. The glass-substrate manufacturing method according to claim 13, wherein:
the second average cooling rate is from 0.5° C./second to 5.5° C./second; and
the third average cooling rate is from 1.5° C./second to 7.0° C./second.

15. The glass-substrate manufacturing method according to claim 1, wherein:
the second average cooling rate is from 0.5° C./second to 5.5° C./second; and
the third average cooling rate is from 1.5° C./second to 7.0° C./second.

16. The glass-substrate manufacturing method according to claim 1, wherein the cooling step further includes a temperature gradient control step of controlling the width-wise temperature gradient of the sheet glass along the flow direction of the sheet glass.

17. The glass-substrate manufacturing method according to claim 16, wherein the sheet glass cooled by said cooling step has a warpage value of 0.15 mm or less.

18. The glass-substrate manufacturing method according to claim 16, wherein the sheet glass cooled by said cooling step has a thickness deviation of 15 μm or less.

* * * * *